United States Patent
Ichikawa (10) Patent No.: US 10,404,107 B2
(45) Date of Patent: Sep. 3, 2019

(54) NON-CONTACT CHARGING DEVICE, AND NON-CONTACT POWER SUPPLY SYSTEM USING SAME

(71) Applicant: Renesas Electronics Corporation, Tokyo (JP)

(72) Inventor: Katsuei Ichikawa, Tokyo (JP)

(73) Assignee: Renesas Electronics Corporation, Tokyo (JP)

( * ) Notice: Subject to any disclaimer, the term of this patent is extended or adjusted under 35 U.S.C. 154(b) by 0 days.

(21) Appl. No.: 15/968,145

(22) Filed: May 1, 2018

(65) Prior Publication Data

US 2018/0248417 A1 Aug. 30, 2018

Related U.S. Application Data

(63) Continuation of application No. 14/425,336, filed as application No. PCT/JP2013/066824 on Jun. 19, 2013, now Pat. No. 9,991,731.

(30) Foreign Application Priority Data

Sep. 5, 2012 (JP) .................................. 2012-194812

(51) Int. Cl.
*H02J 7/02* (2016.01)
*H02J 50/90* (2016.01)
(Continued)

(52) U.S. Cl.
CPC ............. *H02J 50/90* (2016.02); *H02J 7/025* (2013.01); *H02J 17/00* (2013.01); *H02J 50/12* (2016.02);
(Continued)

(58) Field of Classification Search
CPC .. H02J 50/90; H02J 7/025; H02J 50/70; H02J 50/80; H02J 50/12; H02J 17/00; H04B 5/0037
(Continued)

(56) References Cited

U.S. PATENT DOCUMENTS 5,600,225 A 2/1997 Goto
5,608,417 A 3/1997 de Vall
(Continued)

FOREIGN PATENT DOCUMENTS

EP 2 278 684 A2 1/2011
EP 2 284 849 A1 2/2011
(Continued)

OTHER PUBLICATIONS

Nikkei Electronics, dated Mar. 26, 2007, p. 98, Nikkei Bushiness Publications, Inc.
(Continued)

*Primary Examiner* — Robert Grant
*Assistant Examiner* — John T Trischler
(74) *Attorney, Agent, or Firm* — Shapiro, Gabor and Rosenberger, PLLC (57) ABSTRACT

A wide charging area and communication area are ensured in a non-contact power supply system with wireless communication. The present invention includes a resonance coil, a wireless communication antenna coil, a power supply coil, and a sensitivity adjustment circuit coupled to the power supply coil. When electric power is supplied in a contactless manner, the power supply coil and the resonance coil are coupled electromagnetically and electric power supply from the resonance coil is performed by using a magnetic resonance method. When wireless communication is performed, the magnetic fluxes of the wireless communication antenna
(Continued)

US 10,404,107 B2

Page 2 coil are coupled with those of the resonance coil and sensitivity is enhanced by the sensitivity adjustment circuit.

6 Claims, 8 Drawing Sheets

(51) Int. Cl.
    *H02J 50/80*     (2016.01)
    *H02J 50/70*     (2016.01)
    *H02J 17/00*     (2006.01)
    *H04B 5/00*     (2006.01)
    *H02J 50/12*     (2016.01)
    *H01M 10/46*     (2006.01)
    *H02J 7/00*     (2006.01)

(52) U.S. Cl.
    CPC ............. *H02J 50/70* (2016.02); *H02J 50/80* (2016.02); *H04B 5/0037* (2013.01); *H01M 10/46* (2013.01); *H02J 7/0042* (2013.01); *H02J 2007/0096* (2013.01)

(58) Field of Classification Search
    USPC ........................................................ 320/108
    See application file for complete search history.

(56) References Cited

U.S. PATENT DOCUMENTS

| | | | |
|---|---|---|---|
| 6,310,465 B2 | 10/2001 | Najima | |
| 6,415,134 B1 | 7/2002 | Merlin | |
| 7,271,677 B2 | 9/2007 | Troyk et al. | |
| 7,522,878 B2 | 4/2009 | Baarman | |
| 7,761,307 B2* | 7/2010 | Ochi | G06Q 40/00 705/1.1 |
| 7,994,752 B2* | 8/2011 | Soar | H01F 27/365 320/108 |
| 7,996,238 B2* | 8/2011 | Ochi | G06Q 40/00 705/1.1 |
| 8,169,185 B2 | 5/2012 | Partovi et al. | |
| 8,234,509 B2* | 7/2012 | Gioscia | G06F 1/1632 713/300 |
| 8,260,200 B2 | 9/2012 | Shimizu et al. | |
| 8,373,514 B2 | 2/2013 | Cook et al. | |
| 8,378,523 B2 | 2/2013 | Cook et al. | |
| 8,421,409 B2 | 4/2013 | Ichikawa | |
| 8,432,070 B2 | 4/2013 | Cook et al. | |
| 8,457,547 B2* | 6/2013 | Meskens | H04B 5/0075 370/310 |
| 8,482,157 B2 | 7/2013 | Cook et al. | |
| 8,487,478 B2 | 7/2013 | Kirby et al. | |
| 8,487,481 B2 | 7/2013 | Cook et al. | |
| 8,497,658 B2 | 7/2013 | Von Novak et al. | |
| 8,532,724 B2 | 9/2013 | Cook et al. | |
| 8,541,976 B2 | 9/2013 | Arai et al. | |
| 8,581,542 B2 | 11/2013 | Cook et al. | |
| 8,611,815 B2 | 12/2013 | Mohammadian et al. | |
| 8,629,576 B2 | 1/2014 | Levine | |
| 8,629,650 B2 | 1/2014 | Mohammadian et al. | |
| 8,643,219 B2* | 2/2014 | Yabe | H01F 27/2804 307/104 |
| 8,643,326 B2 | 2/2014 | Campanella et al. | |
| 8,645,481 B2 | 2/2014 | Eaton | |
| 8,674,552 B2 | 3/2014 | Shinoda | |
| 8,680,811 B2 | 3/2014 | Mochida et al. | |
| 8,686,685 B2 | 4/2014 | Moshfeghi | |
| 8,723,366 B2 | 5/2014 | Fiorello et al. | |
| 8,723,642 B2 | 5/2014 | Park et al. | |
| 8,754,809 B2 | 6/2014 | Zhou et al. | |
| 8,766,483 B2 | 7/2014 | Cook et al. | |
| 8,791,600 B2* | 7/2014 | Soar | H01F 27/365 307/104 |
| 8,810,072 B2 | 8/2014 | Tsai et al. | |
| 8,810,194 B2 | 8/2014 | Kirby et al. | |
| 8,810,195 B2 | 8/2014 | Mochida et al. | |
| 8,823,319 B2 | 9/2014 | Von Novak, III et al. | |
| 8,853,995 B2 | 10/2014 | Von Novak et al. | |
| 8,854,224 B2 | 10/2014 | Kirby et al. | |
| 8,855,554 B2 | 10/2014 | Cook et al. | |
| 8,860,365 B2 | 10/2014 | Chan et al. | |
| 8,878,393 B2 | 11/2014 | Kirby et al. | |
| 8,892,033 B2* | 11/2014 | Terada | H02J 7/025 455/41.1 |
| 8,892,035 B2 | 11/2014 | Mohammadian et al. | |
| 8,907,858 B2* | 12/2014 | Yang | H01Q 7/00 343/702 |
| 8,922,162 B2 | 12/2014 | Park et al. | |
| 8,929,957 B2 | 1/2015 | Toncich et al. | |
| 8,933,583 B2 | 1/2015 | Uchida | |
| 8,947,041 B2 | 2/2015 | Cook et al. | |
| 8,947,042 B2 | 2/2015 | Kirby et al. | |
| 8,965,461 B2 | 2/2015 | Toncich et al. | |
| 8,970,180 B2 | 3/2015 | Li | |
| 8,971,799 B2* | 3/2015 | Hamada | H02J 7/025 455/41.1 |
| 9,013,141 B2 | 4/2015 | Cook et al. | |
| 9,024,575 B2 | 5/2015 | Oyobe et al. | |
| 9,087,637 B2 | 7/2015 | Jenwatanavet et al. | |
| 9,118,203 B2 | 8/2015 | Davis | |
| 9,124,114 B2* | 9/2015 | Haruyama | H02J 5/005 |
| 9,124,120 B2 | 9/2015 | Cook et al. | |
| 9,130,407 B2 | 9/2015 | Toncich et al. | |
| 9,136,914 B2 | 9/2015 | Von Novak et al. | |
| 9,178,387 B2 | 11/2015 | Mohammadian et al. | |
| 9,184,632 B2 | 11/2015 | Kirby et al. | |
| 9,190,875 B2 | 11/2015 | Mohammadian | |
| 9,236,771 B2 | 1/2016 | Toncich et al. | |
| 9,246,352 B2 | 1/2016 | Park et al. | |
| 9,264,108 B2 | 2/2016 | Von Novak, III | |
| 9,276,437 B2 | 3/2016 | Partovi et al. | |
| 9,312,924 B2 | 4/2016 | Ozaki et al. | |
| 9,319,855 B2* | 4/2016 | Eaton | H02J 7/025 |
| 9,369,002 B2 | 6/2016 | Uchida | |
| 9,373,971 B2 | 6/2016 | Ichikawa et al. | |
| 9,379,780 B2 | 6/2016 | Widmer | |
| 9,401,622 B2 | 7/2016 | Carobolante et al. | |
| 9,404,954 B2 | 8/2016 | Roy et al. | |
| 9,407,334 B2 | 8/2016 | Toncich et al. | |
| 9,410,823 B2 | 8/2016 | Widmer et al. | |
| 9,419,444 B2 | 8/2016 | Eaton | |
| 9,419,470 B2 | 8/2016 | Von Novak, III et al. | |
| 9,425,653 B2 | 8/2016 | Cook et al. | |
| 9,431,844 B2 | 8/2016 | Redding | |
| 9,444,521 B2* | 9/2016 | Hamada | H02J 7/025 |
| 9,450,455 B2 | 9/2016 | Uchida | |
| 9,460,846 B2 | 10/2016 | Graham et al. | |
| 9,461,714 B2 | 10/2016 | Cook et al. | |
| 9,465,064 B2 | 10/2016 | Roy et al. | |
| 9,469,209 B2* | 10/2016 | Ichikawa | H02J 7/025 |
| 9,479,225 B2 | 10/2016 | Wheatley, III et al. | |
| 9,490,653 B2 | 11/2016 | Shevde et al. | |
| 9,502,909 B2 | 11/2016 | El-Maleh et al. | |
| 9,505,315 B2 | 11/2016 | Garcia Briz et al. | |
| 9,508,487 B2 | 11/2016 | Von Novak et al. | |
| 9,533,591 B2* | 1/2017 | Ichikawa | B60L 1/02 |
| 9,543,653 B2 | 1/2017 | Han et al. | |
| 9,543,782 B2 | 1/2017 | Carobolante | |
| 9,553,476 B2* | 1/2017 | An | H01P 11/00 |
| 9,558,884 B2 | 1/2017 | Shimokawa et al. | |
| 9,559,526 B2 | 1/2017 | Von Novak, III et al. | |
| 9,561,730 B2 | 2/2017 | Widmer et al. | |
| 9,577,334 B2* | 2/2017 | Ito | H01Q 7/06 |
| 9,607,757 B2* | 3/2017 | Hirobe | H01Q 5/40 |
| 9,680,313 B2* | 6/2017 | Grilli | G06Q 30/0267 |
| 9,716,402 B2* | 7/2017 | Kirby | H02J 5/005 |
| 9,774,086 B2* | 9/2017 | Cook | H01Q 7/005 |
| 9,793,738 B2* | 10/2017 | Jacobs | H02J 5/005 |
| 9,800,295 B2* | 10/2017 | Jang | G06Q 20/3278 |
| 9,806,565 B2* | 10/2017 | An | H01F 41/14 |
| 9,827,976 B2* | 11/2017 | Ichikawa | H01F 38/00 |
| 9,837,828 B2* | 12/2017 | Uchida | H02J 7/025 |
| 9,935,481 B2* | 4/2018 | Yamaguchi | H02J 50/90 |
| 9,935,487 B2* | 4/2018 | Shibata | H02J 50/05 |

(56) References Cited

U.S. PATENT DOCUMENTS

| | | | |
|---|---|---|---|
| 9,965,660 B2* | 5/2018 | Takeuchi | G06K 7/10316 |
| 9,991,735 B1* | 6/2018 | Yamaguchi | H02J 50/90 |
| 9,997,952 B2* | 6/2018 | Yamaguchi | H02J 50/90 |
| 10,020,673 B2* | 7/2018 | Yamaguchi | H01Q 7/06 |
| 10,027,146 B2* | 7/2018 | Christensen | H02J 7/0063 |
| 10,038,345 B1* | 7/2018 | Georgakopoulos | H02J 50/40 |
| 10,075,001 B2* | 9/2018 | Christensen | H02J 7/0063 |
| 10,075,025 B2* | 9/2018 | Ichikawa | H02J 7/025 |
| 10,193,376 B2* | 1/2019 | Mazooji | H02J 50/10 |
| 10,204,734 B2* | 2/2019 | Hirobe | H01F 38/14 |
| 2001/0002786 A1 | 6/2001 | Najima | |
| 2001/0012208 A1 | 8/2001 | Boys | |
| 2005/0012671 A1 | 1/2005 | Bisig | |
| 2006/0287763 A1 | 12/2006 | Ochi et al. | |
| 2008/0184281 A1 | 7/2008 | Ashizaki et al. | |
| 2009/0058189 A1 | 3/2009 | Cook et al. | |
| 2009/0106137 A1* | 4/2009 | Ochi | G06Q 40/00 705/35 |
| 2009/0108974 A1 | 4/2009 | Raggam et al. | |
| 2009/0146892 A1 | 6/2009 | Shimizu et al. | |
| 2009/0195344 A1* | 8/2009 | Marvel | B61G 5/10 336/200 |
| 2009/0243397 A1 | 10/2009 | Cook et al. | |
| 2009/0284082 A1* | 11/2009 | Mohammadian | G06K 7/0008 307/104 |
| 2009/0284218 A1 | 11/2009 | Mohammadian et al. | |
| 2009/0284220 A1 | 11/2009 | Toncich et al. | |
| 2009/0284227 A1 | 11/2009 | Mohammadian et al. | |
| 2009/0284245 A1 | 11/2009 | Kirby et al. | |
| 2009/0284369 A1 | 11/2009 | Toncich et al. | |
| 2009/0286470 A1 | 11/2009 | Mohammadian et al. | |
| 2009/0286475 A1 | 11/2009 | Toncich et al. | |
| 2009/0286476 A1 | 11/2009 | Toncich et al. | |
| 2010/0033023 A1 | 2/2010 | Baarman | |
| 2010/0045114 A1 | 2/2010 | Sample | |
| 2010/0146308 A1 | 6/2010 | Gioscia et al. | |
| 2010/0151808 A1 | 6/2010 | Toncich et al. | |
| 2010/0194334 A1 | 8/2010 | Kirby et al. | |
| 2010/0201202 A1 | 8/2010 | Kirby et al. | |
| 2010/0201312 A1 | 8/2010 | Kirby et al. | |
| 2010/0213770 A1 | 8/2010 | Kikuchi | |
| 2010/0225271 A1 | 9/2010 | Oyobe et al. | |
| 2010/0277120 A1 | 11/2010 | Cook et al. | |
| 2010/0277121 A1 | 11/2010 | Hall et al. | |
| 2010/0295506 A1 | 11/2010 | Ichikawa | |
| 2010/0311327 A1* | 12/2010 | Hamada | H02J 7/025 455/41.1 |
| 2011/0018358 A1 | 1/2011 | Kozakai | |
| 2011/0018498 A1 | 1/2011 | Soar | |
| 2011/0025264 A1 | 2/2011 | Mochida et al. | |
| 2011/0025265 A1 | 2/2011 | Mochida et al. | |
| 2011/0043050 A1* | 2/2011 | Yabe | H01F 27/2804 307/104 |
| 2011/0043051 A1* | 2/2011 | Meskens | H04B 5/0075 307/104 |
| 2011/0050164 A1 | 3/2011 | Partovi et al. | |
| 2011/0089894 A1* | 4/2011 | Soar | H01F 27/365 320/108 |
| 2011/0156640 A1 | 6/2011 | Moshfeghi | |
| 2011/0181123 A1 | 7/2011 | Ichikawa | |
| 2011/0189954 A1 | 8/2011 | Baarman | |
| 2011/0210620 A1 | 9/2011 | Shinoda et al. | |
| 2011/0278949 A1 | 11/2011 | Tsai et al. | |
| 2011/0298298 A1 | 12/2011 | Baarman | |
| 2012/0001485 A1* | 1/2012 | Uchida | H02J 7/025 307/11 |
| 2012/0007442 A1 | 1/2012 | Rhodes et al. | |
| 2012/0056485 A1 | 3/2012 | Haruyama | |
| 2012/0112555 A1 | 5/2012 | Toshimitsu et al. | |
| 2012/0119698 A1 | 5/2012 | Karalis et al. | |
| 2012/0146576 A1 | 6/2012 | Partovi | |
| 2012/0149307 A1 | 6/2012 | Terada et al. | |
| 2012/0153731 A9 | 6/2012 | Kirby et al. | |
| 2012/0161539 A1 | 6/2012 | Kim et al. | |
| 2012/0161696 A1 | 6/2012 | Cook et al. | |
| 2012/0205988 A1 | 8/2012 | Tanabe | |
| 2012/0212074 A1 | 8/2012 | Uchida | |
| 2012/0235636 A1 | 9/2012 | Partovi | |
| 2012/0242286 A1 | 9/2012 | Takada et al. | |
| 2012/0248888 A1* | 10/2012 | Kesler | H03H 7/40 307/104 |
| 2012/0274148 A1 | 11/2012 | Sung et al. | |
| 2012/0286726 A1 | 11/2012 | Kim et al. | |
| 2012/0293009 A1 | 11/2012 | Kim et al. | |
| 2012/0299538 A1 | 11/2012 | Arai et al. | |
| 2012/0306265 A1* | 12/2012 | Yamamoto | B60L 5/005 307/9.1 |
| 2013/0015812 A1 | 1/2013 | Boyer et al. | |
| 2013/0038277 A1 | 2/2013 | Chan et al. | |
| 2013/0038278 A1 | 2/2013 | Park et al. | |
| 2013/0088192 A1 | 4/2013 | Eaton | |
| 2013/0091225 A1 | 4/2013 | Eaton | |
| 2013/0093390 A1 | 4/2013 | Partovi | |
| 2013/0099585 A1 | 4/2013 | Von Novak et al. | |
| 2013/0119171 A1 | 5/2013 | Partovi | |
| 2013/0119928 A1 | 5/2013 | Partovi | |
| 2013/0119929 A1 | 5/2013 | Partovi | |
| 2013/0147427 A1 | 6/2013 | Polu et al. | |
| 2013/0169062 A1 | 7/2013 | Maikawa et al. | |
| 2013/0234531 A1 | 9/2013 | Budgett et al. | |
| 2013/0300358 A1 | 11/2013 | Kirby et al. | |
| 2013/0307471 A1* | 11/2013 | Ichikawa | H02J 7/007 320/108 |
| 2014/0008992 A1 | 1/2014 | Leabman | |
| 2014/0008993 A1 | 1/2014 | Leabman | |
| 2014/0009109 A1 | 1/2014 | Lee et al. | |
| 2014/0015329 A1 | 1/2014 | Widmer et al. | |
| 2014/0015522 A1 | 1/2014 | Widmer et al. | |
| 2014/0073237 A1* | 3/2014 | Meskens | H04B 5/0075 455/7 |
| 2014/0084688 A1 | 3/2014 | Tzanidis et al. | |
| 2014/0103881 A1 | 4/2014 | Mohammadian et al. | |
| 2014/0139038 A1 | 5/2014 | Konno et al. | |
| 2014/0145514 A1 | 5/2014 | Konno et al. | |
| 2014/0156772 A1 | 6/2014 | Eaton | |
| 2014/0159502 A1* | 6/2014 | Shimokawa | H02J 17/00 307/104 |
| 2014/0168019 A1* | 6/2014 | Hirobe | H01Q 5/40 343/720 |
| 2014/0176068 A1 | 6/2014 | Nishikawa | |
| 2014/0184147 A1 | 7/2014 | Uchida | |
| 2014/0203769 A1 | 7/2014 | Keeling et al. | |
| 2014/0203988 A1* | 7/2014 | Yang | H01Q 7/00 343/842 |
| 2014/0285140 A1* | 9/2014 | Jung | H02J 7/025 320/108 |
| 2014/0327395 A1 | 11/2014 | Ichikawa | |
| 2014/0375262 A1* | 12/2014 | Yamaguchi | H02J 50/90 320/108 |
| 2015/0069963 A1 | 3/2015 | Ichikawa | |
| 2015/0079904 A1 | 3/2015 | Toncich et al. | |
| 2015/0091379 A1* | 4/2015 | Uchida | H02J 7/025 307/11 |
| 2015/0109000 A1 | 4/2015 | Sieber et al. | |
| 2015/0171636 A1 | 6/2015 | Toncich et al. | |
| 2015/0171658 A1 | 6/2015 | Manova-Elssibony et al. | |
| 2015/0171933 A1* | 6/2015 | Hamada | H02J 7/025 455/41.1 |
| 2015/0236537 A1 | 8/2015 | Luo et al. | |
| 2015/0255993 A1 | 9/2015 | Kuerschner et al. | |
| 2015/0372503 A1 | 12/2015 | Toncich et al. | |
| 2016/0031332 A1 | 2/2016 | Garcia Briz et al. | |
| 2016/0056638 A1 | 2/2016 | Hatanaka et al. | |
| 2016/0141882 A1 | 5/2016 | Ichikawa | |
| 2016/0172895 A1 | 6/2016 | Lee et al. | |
| 2016/0238731 A1 | 8/2016 | Chopra et al. | |
| 2016/0359527 A1* | 12/2016 | Jang | G06Q 20/3278 |
| 2016/0380471 A1 | 12/2016 | Moshfeghi | |
| 2016/0380472 A1 | 12/2016 | Moshfeghi | |
| 2017/0018953 A1* | 1/2017 | Yamaguchi | H02J 50/90 |
| 2017/0093170 A1 | 3/2017 | Saunamaki | |
| 2017/0093455 A1* | 3/2017 | Lee | H01Q 1/243 |

(56) References Cited

U.S. PATENT DOCUMENTS

| | | | |
|---|---|---|---|
| 2017/0346342 A1* | 11/2017 | Kim | H02J 50/12 |
| 2018/0043879 A1* | 2/2018 | Ichikawa | H01F 38/00 |
| 2018/0069421 A1* | 3/2018 | Yamaguchi | H02J 50/90 |
| 2018/0076650 A1* | 3/2018 | Yamaguchi | H02J 50/90 |
| 2018/0159357 A1* | 6/2018 | Yamaguchi | H01Q 7/06 |
| 2018/0159358 A1* | 6/2018 | Yamaguchi | H01Q 7/06 |
| 2018/0174747 A1* | 6/2018 | Hirobe | H01F 38/14 |
| 2018/0241242 A1* | 8/2018 | Yamaguchi | H02J 50/90 |
| 2018/0241438 A1* | 8/2018 | Ahn | H04B 5/0087 |
| 2019/0122816 A1* | 4/2019 | Hirobe | H01F 38/14 |

FOREIGN PATENT DOCUMENTS

| | | |
|---|---|---|
| JP | 2002/315209 A | 10/2002 |
| JP | 2006/353042 A | 12/2006 |
| JP | 2012-019302 A | 1/2012 |
| JP | 2012/060721 A | 3/2012 |
| JP | 2012/065476 A | 3/2012 |
| JP | 2004-356765 A | 12/2016 |
| WO | WO 2011/098888 A2 | 8/2011 |

OTHER PUBLICATIONS

Office Action dated Nov. 22, 2016, in Chinese Patent Application No. 201380046156.7.
Extended European Search Report dated Jun. 1, 2016, in European Patent Application No. EP13835877.5.
Office Action dated Feb. 1, 2018, in Chinese Patent Application No. 201380046156.7.
Office Action dated Jul. 26, 2017, in Chinese Patent Application No. 201380046156.7.

\* cited by examiner

Fig.1A

Fig.1B (WHEN WIRELESS COMMUNICATION IS PERFORMED)

Fig.1C (WHEN ELECTRIC POWER IS TRANSMITTED)

Fig.2B (WHEN WIRELESS COMMUNICATION IS PERFORMED)

Fig.2C (WHEN ELECTRIC POWER IS TRANSMITTED)

NON-CONTACT CHARGING DEVICE, AND NON-CONTACT POWER SUPPLY SYSTEM USING SAME

TECHNICAL FIELD

The present invention relates to a non-contact charging device, and relates to a technique applicable to the non-contact charging device and a non-contact power supply system. The non-contact charging device performs data communication with the portable equipment and supplies power source to the portable equipment. The portable equipment is loaded with, for example, a non-contact IC card and a battery.

BACKGROUND ART

As a non-contact power supply system, a system like the one described in FIG. 1 of Patent Document 1 is known. When examining the system described in Patent Document 1, the present inventors first created a diagram for examination based on FIG. 1 of Patent Document 1. The diagram for examination created is FIG. 7. Using FIG. 7, an explanation of the non-contact power supply system is made below.

Figure 7:
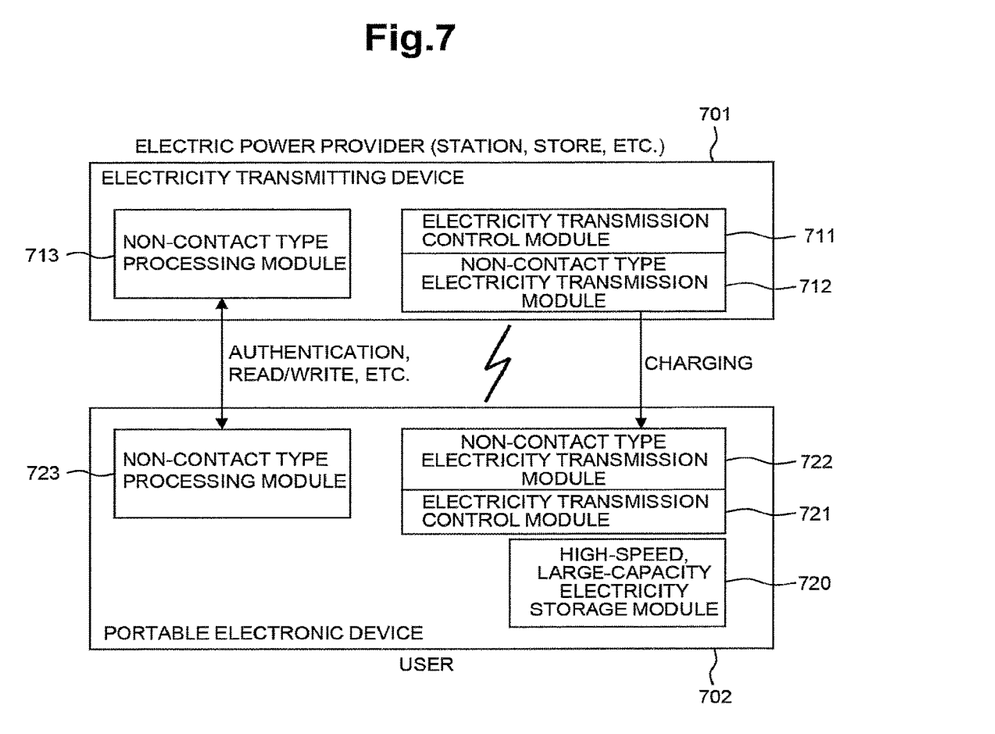
FIG. 7 is a block diagram depicting the blocks of a non-contact power supply system examined beforehand.

The non-contact power supply system depicted in FIG. 7 includes an electricity transmitting device 701 which is provided on the side of an electric power provider such as railroad stations, stores, etc. and a portable electronic device 702 that a user has. A high-speed, large-capacity electricity storage module 720 provided in the portable electronic device 702 is charged in a contactless manner by the electricity transmitting device 701. Thus, the electricity transmitting device 701 can also be regarded as a non-contact charging device.

The electricity transmitting device 701 includes a non-contact type processing module 713 such as an NFC (Near Field Communication) reader, a non-contact type electricity transmission module 712, and an electricity transmission control module 711. The portable electronic device 702 (hereinafter also referred to as a portable terminal device or portable terminal) 702 includes a non-contact type processing module 723 for non-contact type processing operation such as NFC, a non-contact type electricity transmission module 722 for charging, an electricity transmission control module 721 which performs charging judgment and control, and a large-capacity electricity storage module 720 which can be charged at high speed.

A user who owns the portable terminal 702 brings the portable terminal 702 close to the electricity transmitting device 701; by this action, electronic payment or the like is performed. By this action, data transmission (authentication, read/write, etc.) is performed between the non-contact type processing module 713 present in the electricity transmitting device 701 and the non-contact type processing module 723 present in the portable terminal 702 and electronic payment or the like is implemented. On the other hand, by this action, electric power is transmitted in a contactless manner from the non-contact type electricity transmission module 712 present in the electricity transmitting device 701 to the non-contact type electricity transmission module 722 of the portable terminal side. The non-contact type electricity transmission module 722 rectifies received electric power and charges the high-speed, large-capacity electricity storage module 720 with the electric power. The electricity transmission control modules 711, 721 in FIG. 7 perform control of contactless electricity transmission between these modules and charging control for charging the high-speed, large-capacity electricity storage module 720.

In the system of FIG. 7, because the power supply (high-speed, large-capacity electricity storage module 720) of the portable terminal 702 is charged while data transmission (communication) is performed between the non-contact type processing modules 713 and 723, it would become possible to reduce time for charging the portable terminal 702. Especially, if communication between non-contact type processing modules 713 and 723 is frequently performed, the portable terminal 702 can be used continuously without being charged.

Communication and electricity transmission for charging in a contactless manner, depicted in FIG. 7, are implemented in a relatively close range such that distance between the electricity transmitting device 701 and the portable terminal 702 is several centimeters or shorter. Transmission in such a close range is generally based on transmission by magnetic coupling (electromagnetic coupling) such as an electromagnetic induction method and a magnetic resonance method. This is for the following reason: given that, for example, transmission via radio waves is applied, degradation of energy being transmitted is inversely proportional to distance r in the case of transmission via radio waves, whereas degradation of energy being transmitted by electromagnetic coupling is inversely proportional to the square of transmission distance r. Hence, for example, if transmission distance is shorter than 1 m, term $1/(r^2)$ will be larger than $1/r$; therefore, the shorter the transmission distance, transmission by electromagnetic coupling is more advantageous.

A range of frequencies from 100 kHz to ten and several MHz order is used for communication and electricity transmission for charging in a contactless manner. As an antenna for transmitting/receiving these frequencies, an antenna having the shape of a coil with turns ranging from several turns to on the order of several tens of turns is generally used in order to strengthen magnetic coupling and enhance transmission efficiency. As an antenna for use in the portable terminal depicted in FIG. 7 for contactless communication and electricity transmission in a contactless manner, a small coil-shaped antenna with a diameter of on the order of 4 cm which can be built in the terminal housing is used (refer to, e.g., Non-Patent Document 1).

RELATED ART DOCUMENTS

Patent Document

[Patent Document 1] Japanese Unexamined Patent Application Publication No. 2006-353042

Non-Patent Document

[Non-Patent Document 1] Nikkei Electronics, issued on Mar. 26, 2007, p. 98, Nikkei Bushiness Publications, Inc.

DISCLOSURE OF THE INVENTION

Problems that the Invention is to Solve

In the non-contact power supply system depicted in FIG. 7, the electricity transmitting device 701 and the portable terminal 702 are each equipped with an antenna. In this case, an antenna present in the portable terminal 701 which receives electricity is required to be a smaller antenna due to making the portable terminal smaller. On the other hand, it is desirable that an antenna present in the electricity transmitting device 701 which transmits electricity is larger, since when the electricity transmitting device 701 which transmits electricity performs contactless communication and contactless charging with the portable terminal 702 which receives electricity, a wider charging area and a wider wireless communication area allow the electricity receiving device to be placed more freely. However, making the antenna of the electricity transmitting device 701 larger results in a degradation in communication sensitivity in wireless communication, thus making it impossible to sufficiently ensure communication and perform communication. In charging in a contactless manner, an increase in loss of transmission between the antenna of the electricity transmitting device 701 and the antenna of the portable terminal 702 causes a decrease in charging efficiency.

In the non-contact power supply system, unless the wireless communication area nearly coincides with the charging area, depending on a location where the electricity receiving device (portable terminal 702) is placed, such a situation occurs that wireless communication is possible, but charging is impossible, and vice versa. Thus, it is desirable to coincide the wireless communication area with the charging area. However, for an antenna for wireless communication and an antenna for non-contact power supply of the electricity transmitting device 701, an attempt to place them close to each other in order to coincide the wireless communication area of the electricity transmitting device 701 with its charging area could result in degraded communication sensitivity and degraded charging efficiency because of mutual interference between these antennas. When large electric power is transmitted to charge the portable terminal, if isolation provided between the antennas is insufficient, there is a possibility that the electric power leaks in circuitry for wireless communication and destroys the wireless communication circuitry.

In wireless communication for data transmission, wireless communication standards and regulations restrict transmission power to a level lower than in electric power transmission. Thus, an increase in the size of the antenna for wireless communication of the electricity transmitting device 701 reduces a magnetic flux density relative to the antenna area, which in turns reduces the degree of coupling with an antenna for wireless communication present in the portable terminal 702 and causes a decrease in the terminal's receiving sensitivity. Consequently, for the electricity transmitting device 701, restriction is placed on making its antenna for wireless communication larger as compared with its electricity transmitting antenna and, as a result, it is difficult to make its wireless communication area wider.

Other problems and novel features will be apparent from the description in the present specification and the accompanying drawings.

Means for Solving the Problems

According to one embodiment, a resonance coil and a power supply coil are provided as an antenna that is used to transmit electricity. A capacitor is coupled to both ends of the resonance coil and setting is made so that a resonance frequency provided by an inductance that the coil has and a capacitance will be equal to a frequency that is used to transmit electricity. The power supply coil is magnetically coupled with the resonance coil, electric power to be transmitted is transferred from the power supply coil to the resonance coil by magnetic coupling, and the transferred electric power is supplied from the resonance coil to an antenna coil of a portable terminal by a magnetic resonance method. In this case, as a feature of the magnetic resonance method, it is possible to suppress an increase in loss of the resonance coil, which arises due to the effect of signal source impedance of the power supply coil, and, therefore, a stronger magnetic field can be generated from the resonance coil. Accordingly, in an embodiment using the magnetic resonance method, a longer transmission distance is allowed between coils (the coil of the electricity transmitter and the coil of the portable terminal), as compared with an electromagnetic induction method, and a wide charging area can be ensured by enlarging the coil area in the electricity transmitter.

According to one embodiment, an electricity transmitting antenna coil is formed by a magnetic resonance method including the resonance coil and the power supply coil and a wireless communication antenna coil is formed by an electromagnetic induction method comprised of several turns. The resonance coil forming the electricity transmitting antenna coil is placed inward of and close to the wireless communication antenna coil. Alternatively, the wireless communication antenna coil is placed inward of and close to the resonance coil which is the electricity transmitting antenna coil. Accordingly, the resonance coil can be used to transmit electricity when electricity is transmitted and, besides, the resonance coil can also be used as an antenna coil when wireless communication is performed. Meanwhile, a suppression circuit is provided between the terminals of the wireless communication antenna coil. By placing the suppression coil in ON state when electricity is transmitted, a part of electric power to be transmitted can be prevented from leaking into a circuit for wireless communication and the circuit for wireless communication can be prevented from being destroyed.

Further, according to one embodiment, an adjustment circuit is added between the terminals of the power supply coil so that communication sensitivity of wireless communication can be enhanced. Accordingly, impedance between the terminals of the power supply coil is adjusted by the adjustment circuit during wireless communication and sensitivity during wireless communication can be improved by using coupling between the power supply coils from the wireless communication antenna coil.

In an embodiment in which different frequencies are used when wireless communication is performed and when electricity is transmitted, an arrangement is made such that the capacitance value of a resonance capacitor that is coupled to the resonance coil can be changed. Accordingly, the resonance frequency can be changed to match a frequency for wireless communication and can also be changed to match a frequency for electricity transmission and the resonance coil can be utilized both at the time of wireless transmission and at the time of electricity transmission even in a case where different frequencies are used for wireless communication and electricity transmission.

Effects of the Invention

According to one of the foregoing embodiments, it would become possible to prevent the circuit for wireless communication from being destroyed by electric power leakage in the circuit for wireless communication when electricity is transmitted. Also, the wireless communication area when wireless communication is performed can be widened, and both the wireless communication area and the charging area can be widened and the area can be matched. Accordingly, a non-contact power supply system that operates properly even when a portable terminal gets out of position is achievable.

BEST MODE FOR CARRYING OUT THE INVENTION

First Embodiment

Figure 1A:
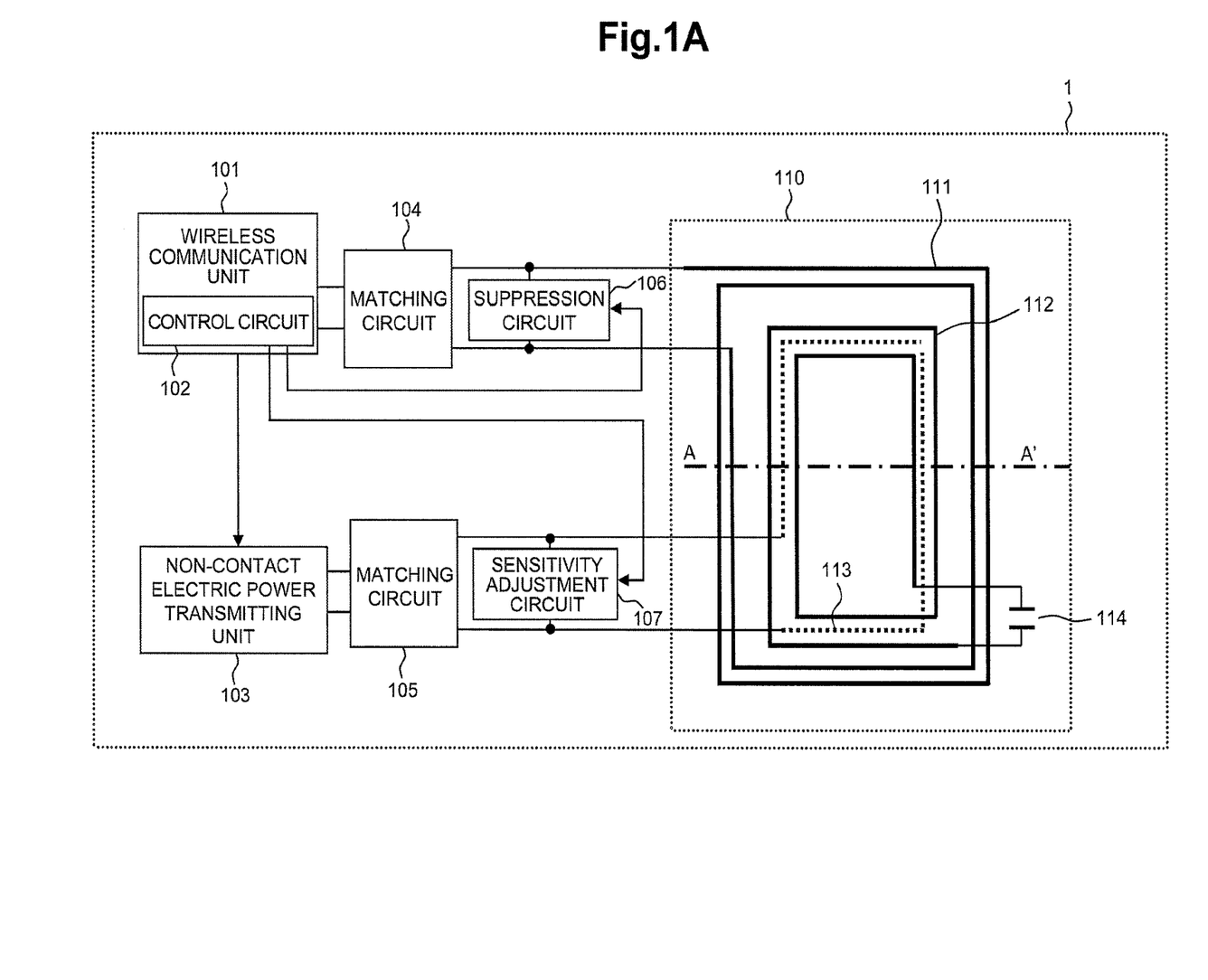
FIG. 1A is a block diagram depicting a non-contact charging device of a first embodiment.

A block diagram of a non-contact charging device which is a first embodiment is depicted in FIG. 1A. In FIG. 1A, referential numeral 1 is the non-contact charging device; 101 is a wireless communication unit such as NFC, 102 is a control circuit, 103 is a non-contact electric power transmitting unit, 104, 105 are matching circuits, 106 is a suppression circuit, 107 is a sensitivity adjustment circuit (which may also be referred to as an adjustment circuit hereinafter), and 110 is an electricity transmitting antenna unit. The electricity transmitting antenna unit 110 includes a wireless communication antenna coil 111, a resonance coil 112, a power supply antenna coil 113 (represented by a dotted line), and a resonance capacitor 114. Although not restrictive, the wireless communication unit 101 and the non-contact electric power transmitting unit 103 are each formed in a single semiconductor chip.

In FIG. 1A, the wireless communication unit 101 is coupled to the wireless communication antenna coil 111 via a matching circuit 104 and the suppression circuit 106 is coupled to both ends of the coil 111. On the other hand, the non-contact electric power transmitting unit 103 is coupled to power supply coil 113 via a matching circuit 105 and the adjustment circuit 107 is coupled to both ends of the power supply coil 113. The resonance capacitor 114 is coupled in parallel with the resonance coil 112 and their values are set so that a resonance frequency provided by a self-inductance value that the resonance coil 112 has and a capacitance of the resonance capacitor will be equal to an electricity transmitting frequency. As you may understand from a description provided later, the suppression circuit 106 is placed in ON state when electricity is transmitted and placed in OFF state when communication is performed. On the other hand, the adjustment circuit 107 is placed in OFF state when electricity is transmitted and placed in ON state when communication is performed.

The above matching circuit 104 is set to make impedance matching between the wireless communication unit 101 and the coil 111 when the suppression circuit 106 is placed in OFF state. At this time, since the coil 111 is magnetically coupled to both the resonance coil 112 and the power supply coil 113, impedance matching is designed to be made in a reflection of an effect on the coil 111 arising by the provision of the resonance coil 112 and an effect on the coil 111 arising by the power supply coil 113 when the adjustment circuit 107 is placed in ON state. Thereby, the impedance matching between the wireless communication unit 101 and the coil 111 is made to be optimal when communication is performed, i.e., when the suppression circuit 106 is placed in OFF state and the adjustment circuit 107 is placed in ON state, and communication sensitivity can be enhanced.

In this embodiment, wireless communication and electricity transmission are performed exclusively. Thus, the above matching circuit 105 is set to make impedance matching between the non-contact electric power transmitting unit 103 and the power supply coil 113 with the adjustment circuit 107 being placed in OFF state.

Then, non-contact power supply operation is described below. The control circuit 102 provided in the wireless communication unit 101 of the non-contact charging device 1 sets the suppression circuit 106 in OFF state and the adjustment circuit 107 in ON state. Also, the control circuit 102 makes the wireless communication unit 101 operate continuously or intermittently to detect whether an electricity receiving device (a portable terminal, not depicted) is placed close to the non-contact charging device 1. If the wireless communication unit 101 has detected radio waves from the portable terminal, it judges that the portable terminal (not depicted) has placed close to the non-contact charging device (electricity transmitting device) 1, the wireless communication unit 101 performs communication with the portable terminal, and the control circuit 102 makes a judgment as to whether the placed portable terminal is equipment to be charged. If the placed portable terminal has successfully been authenticated to be the equipment to be charged, the control circuit 102 makes the suppression circuit 106 turn into ON state and the adjustment circuit 107 turn into OFF state. At this time, the control circuit 102 makes the non-contact electric power transmitting unit 103 turn into ON state. Thereby, the non-contact electric power transmitting unit 103 outputs electric power to be transmitted to the power supply coil 113 via the matching circuit 105. The electric power to be transmitted is transmitted via the resonance coil 112 to the electricity receiving device and charging a battery inside the electricity receiving device with the electric power is performed.

Figure 1B:
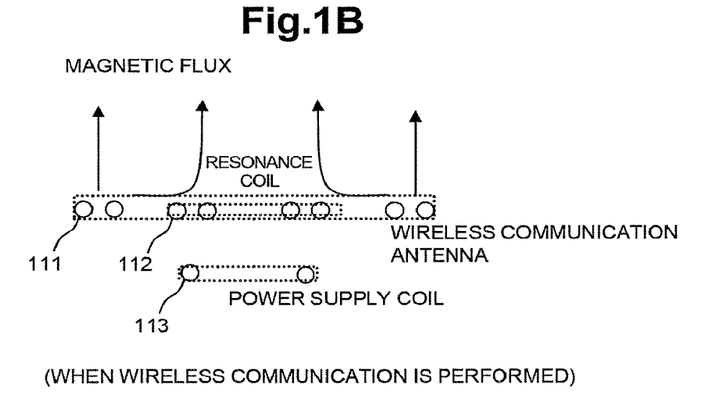
FIG. 1B is a schematic layout depicting placement of coils in an electricity transmitting coil unit of the first embodiment.
Figure 1C:
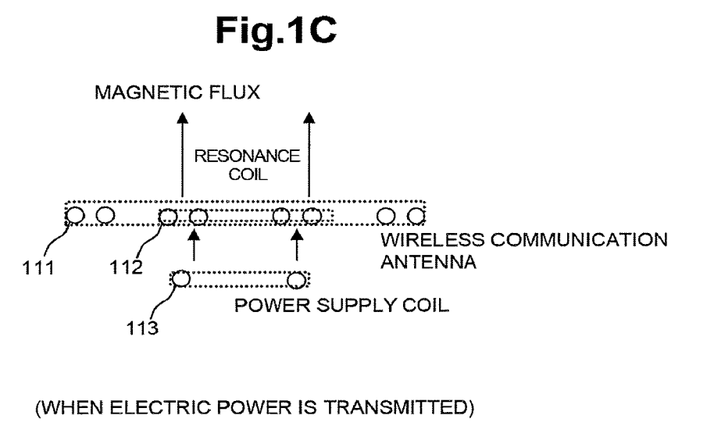
FIG. 1C is a schematic layout depicting placement of the coils in the electricity transmitting coil unit of the first embodiment.

An example of placement of electricity transmitting antenna coils 111, 112, and 113 at this time and a magnetic flux direction is depicted in FIG. 1B and FIG. 1C. FIG. 1B and FIG. 1C are each a view of a cross section along line A-A' of the antenna unit 110 depicted in FIG. 1A. As can be seen from FIG. 1, the resonance coil 112 is provided inward of the wireless communication antenna coil 111 on the same plane and the power supply coil 113 is provided under (facing the underside of) the resonance coil 112 so as to vertically overlap the resonance coil 112. Although not restrictive, each coil is comprised of several turns of wire winding. In FIG. 1, magnetic fluxes when wireless communication is performed are indicated by arrowed lines in FIG. 1B and magnetic fluxes when electric power is transmitted are indicated by arrowed lines in FIG. 1C.

As a magnetic flux direction, the magnetic fluxes are directed from the coils toward the portable terminal. As can be seen from FIG. 1B with the indication of magnetic fluxes when wireless communication is performed, it is thought that the magnetic fluxes at this time are passing from the wireless communication antenna coil 111 toward the electricity receiving device and, additionally, the magnetic fluxes via the resonance coil 112 are also passing. Thereby, wireless communication via the resonance coil 112 is also performed and, thus, it would become possible to realize a wider communication area. Wireless communication sensitivity at this time is adjusted by means of the adjustment circuit 107 coupled to both ends of the power supply coil 113. That is, when wireless communication is performed, the adjustment circuit 107 is placed in ON state. An inductance value of the resonance coil 112 and a capacitance value of the resonance capacitor 114 are set so that a good efficiency of electricity transmission is gained when electricity is transmitted, when the adjustment circuit 107 is placed in OFF state. However, when wireless communication is performed, the inductance value of the resonance coil 112 and the capacitance value of the resonance capacitor 114, which have been set, are not necessarily optimal because of condition difference such as different positions in which the power supply coil 113 and the wireless communication antenna 111 are placed. That is, when wireless communication is performed, it is thought that there occurs a difference between a resonance frequency provided by the resonance coil 112 and the resonance capacitor 114 and a resonance frequency based on the wireless communication antenna coil. To cope with this, when wireless communication is performed, the adjustment circuit 107 is placed in ON state and makes an adjustment so that a resonance frequency provided by the coil 111 and the adjustment circuit 107 will be equal to a resonance frequency which is determined by the resonance coil 112 and the resonance capacitor 114. This adjustment is performed, for example, by the settings of capacitors or/and resistors comprised in the adjustment circuit 107, as will be described later. This arrangement is intended to enhance sensitivity when wireless communication is performed.

Then, when electricity is transmitted, depicted in FIG. 1C, magnetic fluxes from the power supply coil 113 are coupled with those of the resonance coil 112 and stronger magnetic fluxes are transmitted to the electricity receiving device. At this time, the wireless communication antenna coil 111 is short-circuited by the suppression circuit 106, for example, across the coil terminals. This makes it possible to stop current supply to the matching circuit 104, although current flows by induced electromotive force inside the coil 111, and makes it possible to prevent the wireless communication unit 101 and the matching circuit 104 from being destroyed by an excessive voltage.

While it is thought that interference occurs between the wireless communication antenna coil 111 and the power supply coil 113 or between the electricity transmitting antenna coil and the wireless communication antenna coil 111, such interference is to a negligible extent.

In the foregoing first embodiment, there is little mutual interference between the wireless communication antenna coil and the electricity transmitting antenna coil, even when these coils were placed close to each other in order to coincide the wireless communication area with the charging area. When wireless communication is performed, it would become possible to widen the wireless communication area by coupling magnetic fluxes of the wireless communication antenna coil 111 with those of the resonance coil 112. When electricity is transmitted, the suppression circuit 106 makes it possible to prevent the wireless communication unit 101 or the matching circuit 104 from being destroyed.

In this embodiment, when electricity is transmitted, electric power is supplied by magnetic resonance between the resonance coil 112 and an antenna (coil) present in the portable terminal. At this time, coupling between the resonance coil 112 and the power supply coil 113 is made by magnetic inductance. When wireless communication is performed, signal transmission is performed by electromagnetic inductance between the antenna of the portable terminal and the wireless communication antenna coil 111 (as well as the resonance coil 112).

Second Embodiment

Figure 2A:
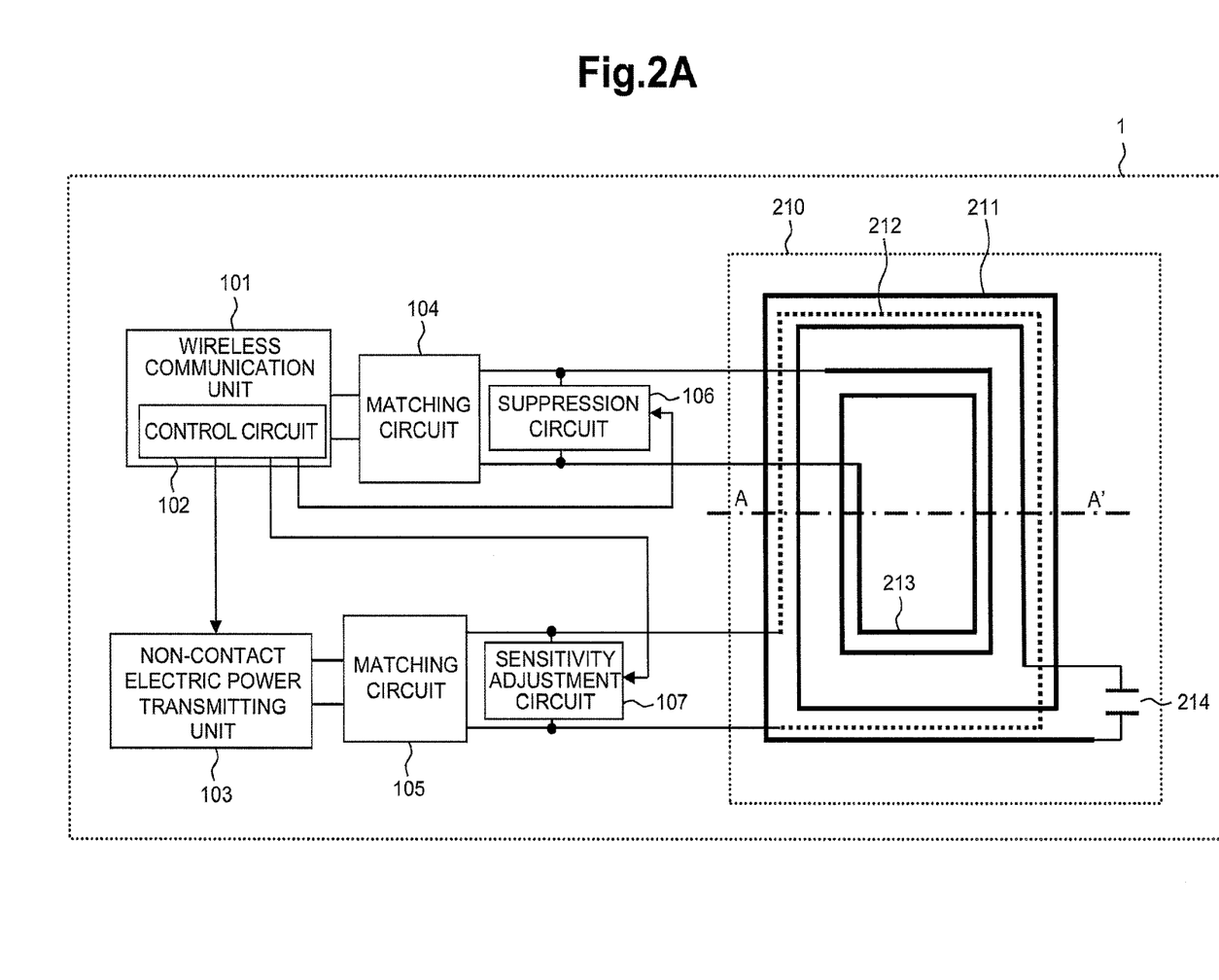
FIG. 2A is a block diagram depicting a non-contact charging device of a second embodiment.

A block diagram of a non-contact charging device which pertains to a second embodiment is depicted in FIG. 2A. In FIG. 2A, parts corresponding to those in FIG. 1A are assigned the same reference numerals. Description on the same parts is omitted and a different part is only described.

In FIG. 2A, a part that differs from FIG. 1A is an electricity transmitting antenna unit. In FIG. 2A, the electricity transmitting antenna unit is denoted by reference numeral 210. The electricity transmitting antenna unit 210 includes a resonance coil 211, a power supply coil 212 (represented by a dotted line), a wireless communication antenna coil 213, and a resonance capacitor 214. As you may understand from FIG. 2B and FIG. 2C with which a description will be provided later, a structure of the antenna unit, unlike the electricity transmitting antenna depicted in FIG. 1A, is such that the wireless communication antenna coil 213 is placed inward of the resonance coil 211 and the power supply coil 212.

Figure 2B:
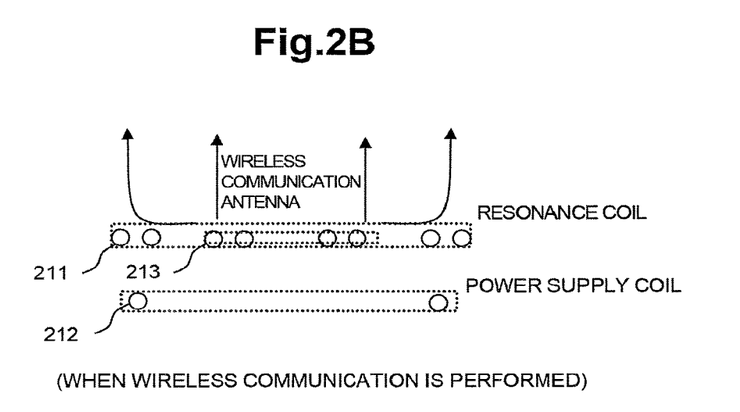
FIG. 2B is a schematic layout depicting placement of the coils in the electricity transmitting coil unit of the second embodiment.
Figure 2C:
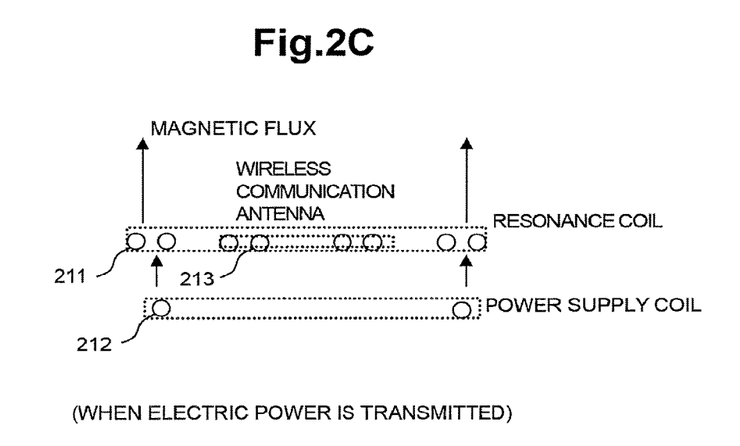
FIG. 2C is a schematic layout depicting placement of the coils in the electricity transmitting coil unit of the second embodiment.

In FIG. 2B and FIG. 2C, placement of the coils of the electricity transmitting antenna unit 210 and a magnetic flux direction are depicted. The direction of magnetic fluxes when wireless communication is performed is indicated by arrowed lines in FIG. 2B and magnetic fluxes when electric power is transmitted are indicated by arrowed lines in FIG. 2C. As the placement of the coils, the resonance coil 211 and the wireless communication antenna coil 213 are placed on the same plane and the power supply coil 212 is placed under the resonance coil 211 so as to vertically overlap the resonance coil 211. That is, the wireless communication antenna coil 213 is placed inward of and close to the resonance coil 211 and the power supply coil 212. As is the case for the first embodiment, a view of a cross section along line A-A' in FIG. 2A is depicted as FIG. 2B and FIG. 2C. The portable terminal is installed in a position opposite to the power supply coil 212 with the resonance coil 211 being in a middle position. That is, the portable terminal is placed in position in a direction of the arrowed lines of magnetic fluxes.

Also in the case of the second embodiment depicted in FIG. 2A, when wireless communication is performed, it is thought that the magnetic fluxes are passing via the resonance coil 211 not only the wireless communication antenna 213, as depicted in FIG. 2B. Thus, it would become possible to widen the wireless communication area, as is the case for the first embodiment depicted in FIG. 1A. Moreover, the placement of the coils in the second embodiment is more beneficial in terms of the efficiency of electric power transmission in a case when a frequency of wireless communication differs from a frequency of electricity transmission, especially when the frequency of electricity transmission is lower than the frequency of wireless communication. This is for the following reason: when the frequency of electricity transmission is lower than the frequency of wireless communication, the self-induction value of the resonance coil must be made larger to suppress a decrease in the efficiency of electric power transmission, and placing the resonance coil outward of the wireless communication coil 213 makes it easy to obtain a larger self-induction value.

In this way, the second embodiment has an advantageous effect in which it is possible to suppress a decrease in the efficient of electric power transmission when the frequency of electricity transmission is lower than the frequency of wireless communication, in addition to advantageous effects described in the first embodiment section.

Third Embodiment

Figure 3:
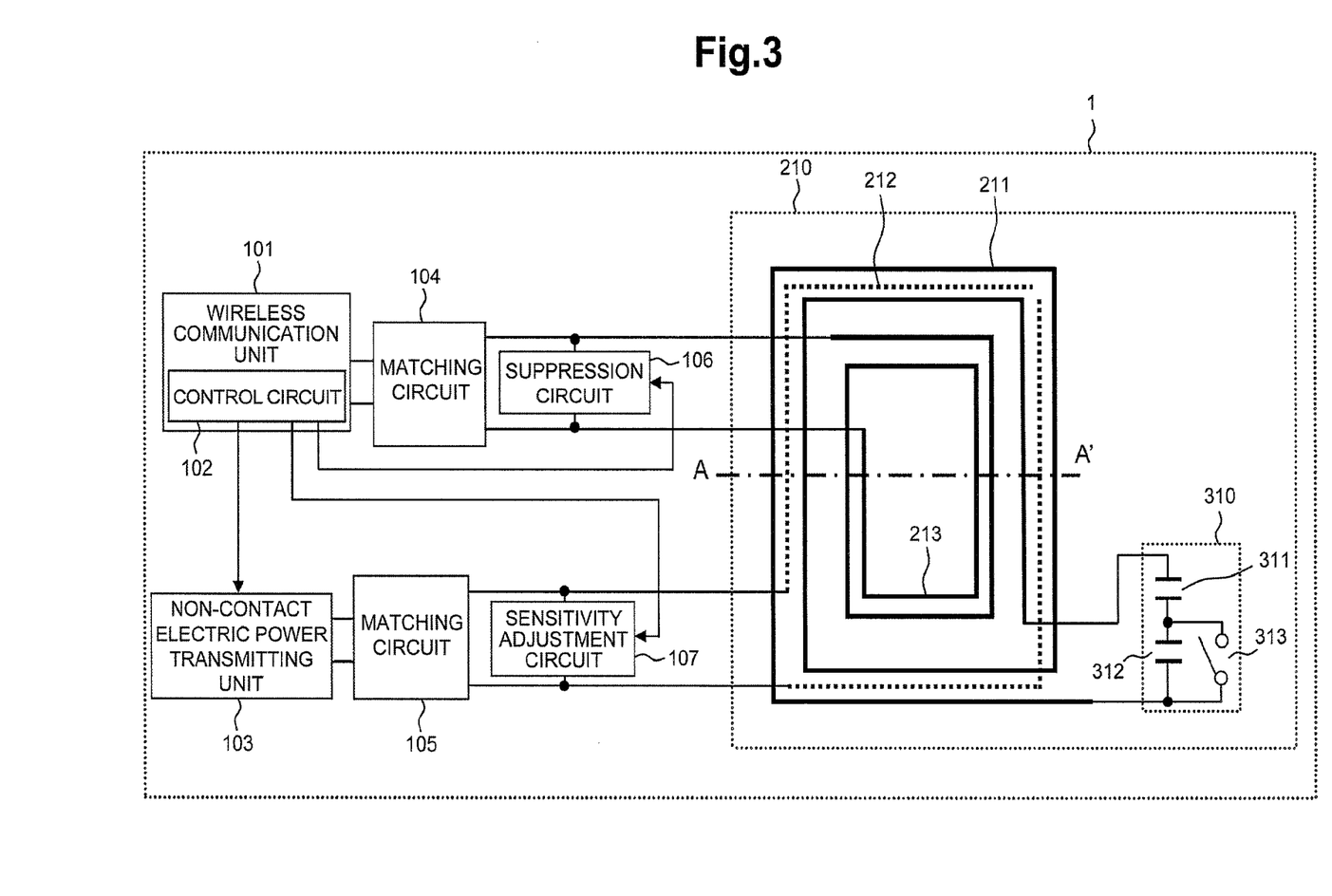
FIG. 3 is a block diagram depicting a non-contact charging device of a third embodiment.

A block diagram of a non-contact charging device which pertains to a third embodiment is depicted in FIG. 3. In FIG. 3, parts corresponding to those in FIGS. 1 and 2, described previously, are assigned the same reference numerals. Description on the same parts is omitted and a different part is only described.

In FIG. 3, a part that differs from FIGS. 1 and 2 lies in that the resonance capacitor 114 (214) is changed to a resonance capacitor switching circuit 310.

The resonance capacitance switching circuit 310 includes a resonance capacitor 311 which is used when electricity is transmitted, a compensating capacitor 312 which is used when wireless communication is performed, and a switch circuit 313. In this switching circuit, the resonance capacitor 311 and the compensating capacitor 312 are coupled in series and the switch circuit 313 is coupled in parallel with the compensating capacitor 312. The resonance capacitance switching circuit 310 is used when the frequency of wireless communication differs from the frequency of electricity transmission. That is, in a case when the frequency of wireless communication differs from the frequency of electricity transmission, the switch circuit 313 is turned ON/OFF depending on which of electricity transmission and wireless communication should be performed. In other words, the resonance capacitance switching circuit 310 can be regarded as a variable capacitance circuit. Because the control circuit 102 determines to perform which of electricity transmission and wireless communication, turning the switch circuit 313 ON/OFF is controlled by the control circuit 102. For electricity transmission, a lower frequency than for wireless communication is thought to be used. It can be thought that, for example, as a wireless communication frequency, 13.56 MHz which is widely used for RFID or the like; as an electricity transmission frequency, 6.78 MHz is used.

If the above-mentioned frequencies are used, when wireless communication is performed, the switch circuit 313 is placed in OFF state by the control circuit 102. This leads to that a resonance circuit formed of a capacitance of series-coupling of the resonance capacitor 311 and the compensating capacitor 312 and the resonance coil 211 resonates with a wireless frequency (e.g., 13.56 MHz). On the other hand, when electricity is transmitted, the control circuit 102 places the switch circuit 313 in ON state and the compensating capacitor 312 in a short-circuited state. This leads to that, when electricity is transmitted, a resonance circuit formed of the resonance capacitor 311 and the resonance coil 211 resonates with a frequency of electricity transmission (e.g., 6.78 MHz).

With the structure as above, by changing the resonance frequency of the resonance coil to be used when wireless communication is performed and when electricity is transmitted, it would become possible to use the resonance coil both when wireless communication is performed and when electricity is transmitted even in a case where the frequency of wireless communication differs from the frequency of electricity transmission, as is the case for the second embodiment depicted in FIG. 2A.

Figure 4:
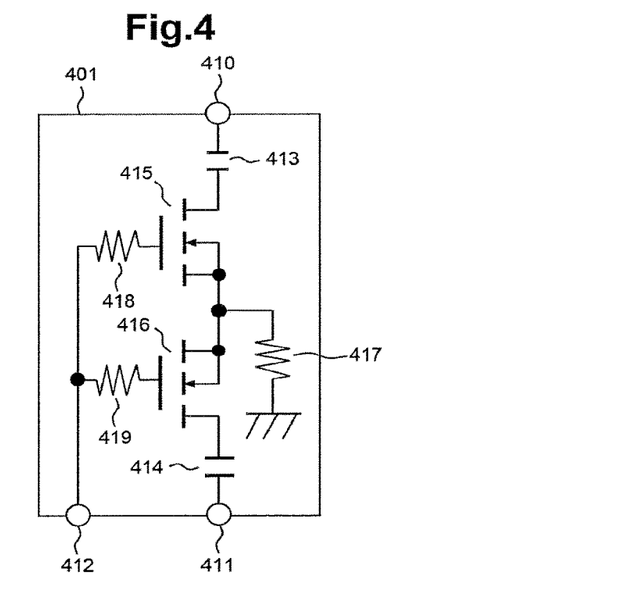
FIG. 4 is a circuit diagram of a semiconductor switch circuit.

FIG. 4 is a circuit diagram of a switch circuit within a suppression circuit, an adjustment circuit, and a resonance frequency switching circuit which are used in the foregoing first through third embodiments. In FIG. 4, reference numeral 401 is a switch circuit that makes the switch circuit 313 within the suppression circuit (106 in FIG. 1 as an example), adjustment circuit (107 in FIG. 1), and resonance frequency switching circuit (301 in FIG. 3). In FIG. 4, reference numerals 410, 411 are terminals; 412 is a control terminal; 413, 414 are capacitors; 415, 416 are field effect transistors (which may also be referred to as transistors hereinafter); 417 is a grounding resistor; and 418,419 are bias resistors. The respective sources of the field effect transistors 415, 416 are coupled to a common node and the common coupling node is grounded via the grounding resistor 417. The respective drains of the field effect transistors 415, 416 are series-coupled via the capacitors 413, 414 to the terminals 410, 411, respectively. The drains of the field effect transistors 415, 416 are coupled via the bias resistors 418, 419, respectively, to the control terminal 412.

While the switch circuit 401 is used in each of the suppression circuit, adjustment circuit, and resonance frequency switching circuit, the resistor 417 and the capacitors 413, 414 work differently according to the circuit in which they are used and, therefore, how they work in each of the above circuits is described below.

In the switch circuit 401 comprised in the suppression circuit (106 in FIG. 1), a terminal 410 is coupled to one end of the wireless communication antenna coil 111 and a terminal 411 is coupled to the other end of the coil 111. To the control terminal 412, a control signal from the control circuit 102 is supplied. By this control signal, the transistors 415 and 416 are placed in ON state when electric power is supplied and the transistors 415 and 416 are placed in OFF state when wireless communication is performed. Accordingly, the switch circuit 401 (the suppression circuit, here) is placed in ON state or OFF state. By using the switch circuit having a structure in which the field effect transistors are coupled in series, even with a relatively high voltage amplitude when electricity is transmitted, a voltage applied between the drains and sources of the field effect transistors is decreased by half because the transistors are series-coupled. Thus, because the switch circuit has a high voltage-withstanding capacity and is available at a relatively low price, it would be suitable as a semiconductor switch circuit for use in a non-contact power supply system. The capacitors 413, 414 make it possible to prevent the application of a DC voltage to the transistors, and an undesired change in the characteristics of the transistors can be prevented. As the resistor 417, a resistor with a higher resistance than the impedance of a signal transmission path is used. This makes it possible to fix the source potential of each transistor to ground potential when each transistor is in operation.

In the switch circuit 401 comprised in the adjustment circuit (107 in FIG. 1), the terminal 410 is coupled to one end of the power supply coil 113 and the terminal 411 is coupled to the other end of the coil 113. To the control terminal 412, a control signal from the control circuit 102 is supplied. By this control signal, the transistors 415 and 416 are placed in OFF state when electric power is supplied and the transistors 415 and 416 are placed in ON state when wireless communication is performed. Accordingly, the switch circuit 401 (the adjustment circuit, here) is placed in ON state or OFF state. When the adjustment circuit (switch circuit) is turned to ON state when wireless communication is performed, that is, when the transistors 415 and 416 are turned to ON state, a CR (capacitance-resistance) circuit including the capacitors 413, 414 and the resistor 417 is formed between both ends of the power supply coil 113. Capacitance values of the capacitors 413, 414 or/and a resistance value of the resistor 417 are set so that a resonance frequency provided by the coil 111 and the above CR circuit will match the resonance frequency of a resonance circuit comprised of the resonance coil 112 and the resonance capacitor 114, when wireless communication is performed. When these capacitance and resistance values are set, they are set taking account of the ON resistances of the transistors 415, 416 as well.

In the switch circuit 401 making the switch circuit 313 within the resonance frequency switching circuit (310 in FIG. 3), the terminal 410 is coupled to one end (the terminal of the capacitor 312) of the resonance coil 211 and the terminal 411 is coupled to a common coupling node between the resonance capacitor 311 and the resonance capacitor 312. That is, the switch circuit 401 is coupled in parallel with the capacitor 312. To the control terminal 412, a control signal from the control circuit 102 is supplied. By this control signal, the transistors 415 and 416 are placed in OFF state when wireless communication is performed and the transistors 415 and 416 are placed in ON state when electric power is supplied. Accordingly, the switch circuit 401 (the resonance frequency switching circuit, here) is placed in ON state or OFF state. When the switch circuit 401 is used in this way as the switch circuit 313 within the resonance frequency switching circuit 310, the capacitors 413, 414 and the resistor 417 work the same as those capacitors and resistor in the suppression circuit. In a case where the switch circuit 401 is used as the switch circuit 313, possibility that a DC voltage is applied is low. So, the above capacitors 413, 414 may be dispensed with and it is also possible to make the switch smaller by dispensing with them.

Figure 5A:
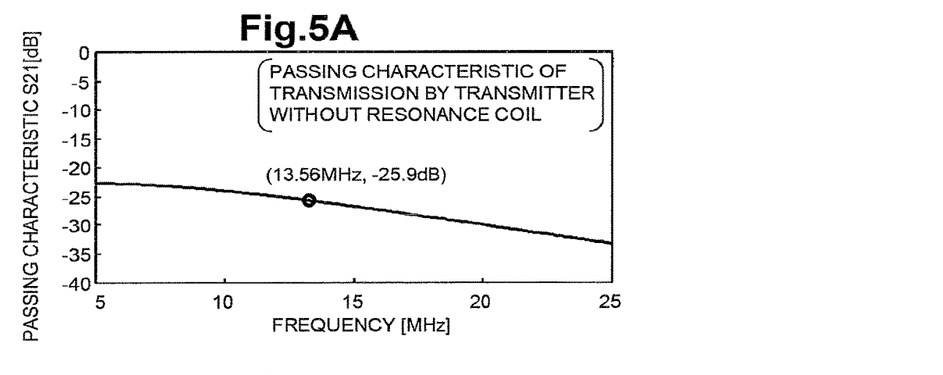
FIG. 5A is a characteristic diagram representing a transmission characteristic between antennas when wireless communication is performed.
Figure 5B:
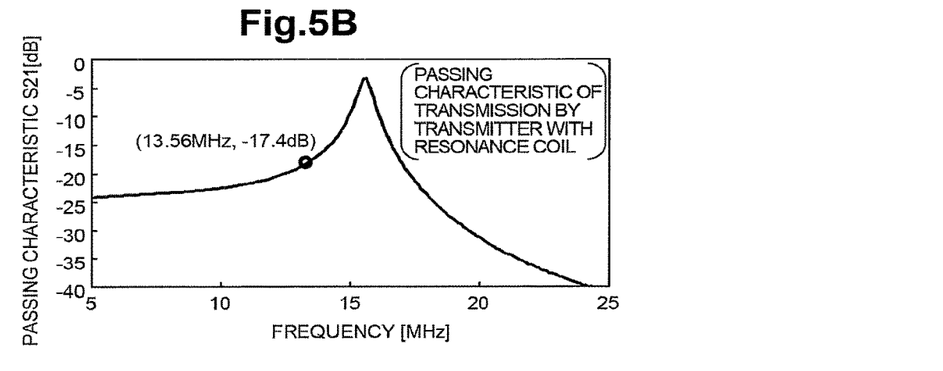
FIG. 5B is a characteristic diagram representing a transmission characteristic between antennas when wireless communication is performed.

By way of FIGS. 5A and 5B, the following describes the result of an experiment for confirming that the wireless communication sensitivity is enhanced by placing the resonance coil close to the coil for wireless communication when wireless communication is performed. FIG. 5A represents a transmission characteristic between wireless communication antenna coils under the condition that the electricity transmitting side is equipped with only a wireless communication antenna brought to face a wireless communication antenna of the electricity receiving side. FIG. 5B represents a transmission characteristic in a case where the resonance coil and the power supply coil were placed inward of the wireless communication antenna coil, as illustrated in the first embodiment. In FIG. 5, the abscissa indicates frequency and the ordinate indicates a passing characteristic.

Antenna coils used in the experiment are as follows: a wireless communication antenna coil of 8 cm×13 cm, 4 turns; a resonance coil of 6.5 cm×11.5 cm, 8 turns; a resonance capacitor of 22 pF; a power supply coil of 5 cm×9.5 cm, 1 turn; and an wireless communication antenna coil of the opposite side, i.e., an electricity receiving device is 4 cm×4 cm, 3 turns. Conditions are as follows: the frequency of wireless communication and electricity transmission is 13.56 MHz; and the distance between wireless communication antennas is 1 cm.

Comparing FIGS. 5A and 5B shows that passing loss between wireless communication antennas is about 8.5 dB higher in FIG. 5B for the case in which there is the resonance coil; because the loss between wireless communication antenna coils can be decreased by the resonance coil, communication sensitivity can be enhanced.

Figure 6:
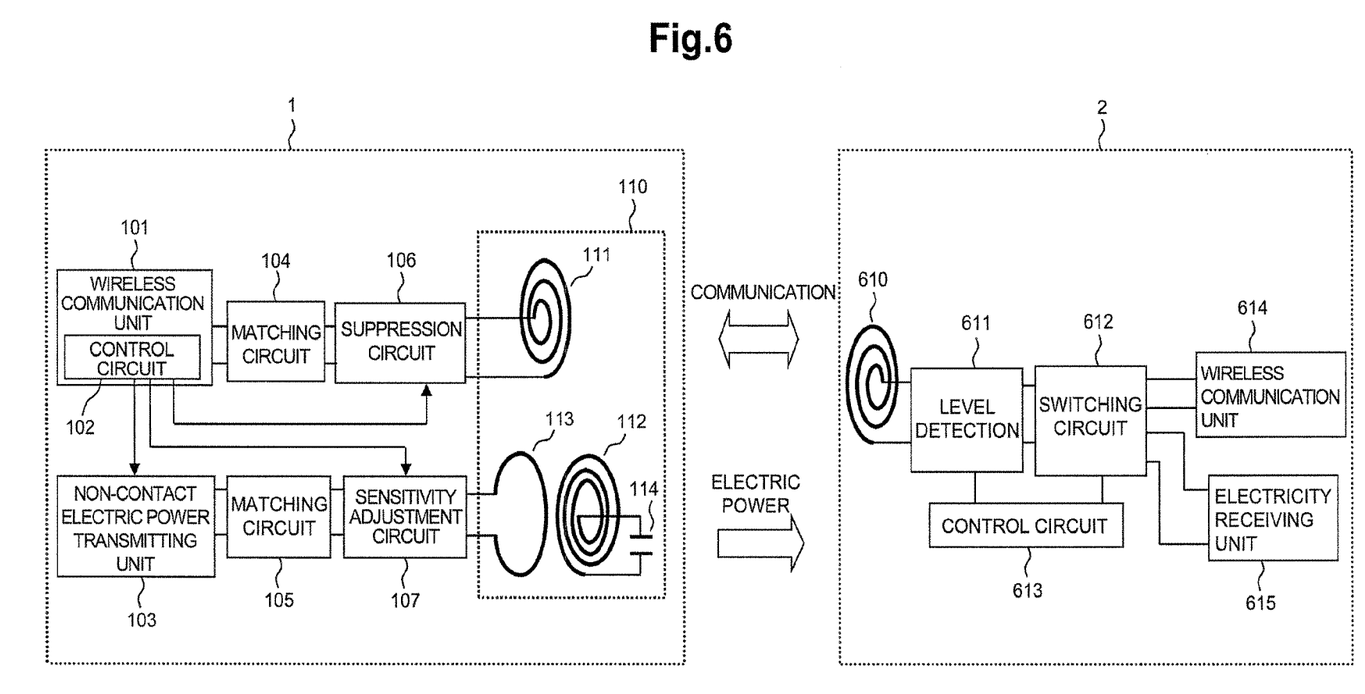
FIG. 6 is a block diagram depicting a non-contact power supply system.

By way of FIG. 6, the following describes an example of an overall operation of a non-contact power supply system including an electricity receiving device in accordance with the foregoing first through third embodiments. FIG. 6 is the non-contact power supply system on the assumption that the electricity receiving device is loaded in small-size portable equipment or the like.

In FIG. 6, reference numeral 2 is an electricity receiving device (portable terminal) and 610 is an electricity transmitting antenna unit. In FIG. 6, the non-contact charging device 1 has the same configuration as in the first embodiment depicted in FIG. 1A. The antenna unit 110 is depicted in simplified form to avoid complicated depiction. Since the non-contact charging device 1 is previously described with FIG. 1, its description is omitted here.

The electricity receiving device 2 is comprised of a common-use antenna coil 610 which is commonly used as a wireless communication antenna and an electricity receiving antenna, a level detection circuit 611, a switching circuit 612, a control circuit 613, a wireless communication unit 614, and an electricity receiving unit 615. In this embodiment, these blocks (common-use antenna coil 610, level detection circuit 611, switching circuit 612, control circuit 613, wireless communication unit 614, and electricity receiving unit 615) are sealed in a single IC card as a non-contact IC card. The non-contact IC card is loaded in the portable terminal, together with a battery which is not depicted, and the blocks operate, powered by the battery. The battery is charged by the electricity receiving unit 615. Instead of sealing the above blocks in the IC card, the portable terminal may be equipped with a wireless communication function and a non-contact power supply function which are implemented by the blocks and the battery. A further description is provided, focusing on the operation of the electricity receiving device 2 in the non-contact power supply system.

The switching circuit 612 in the electricity receiving device 2 is usually placed to a position for conduction to the wireless communication unit 614 so that the wireless communication unit is ready to receive a wireless communication signal from the electricity transmitting device 1. When placed close to the electricity transmitting device 1, the electricity receiving device 2 receives a wireless communication signal from the electricity transmitting device 1 and performs wireless communication. The electricity transmitting device 1 performs authentication as to whether or not the electricity receiving device 2 should be charged. If it has been judged that the electricity receiving device 2 should be charged, an electricity transmission signal is transmitted from the electricity transmitting device. At this time, when the level detection circuit 611 in the electricity receiving device 2 detects the electricity transmission signal having higher receiving power than a wireless signal, the control circuit 613 causes the switching circuit 612 to switch to a position for conduction to the electricity receiving unit 615, thus allowing input of received electric power to the electricity receiving unit 615. In the electricity receiving unit 615, the received electric power is rectified and supplied via a charging control circuit to charge the battery (not depicted) loaded in the electricity receiving device 2. Although not depicted in FIG. 6, the respective blocks of the portable terminal 1 are supplied with power source from the battery.

At this time, because wireless communication is disabled while the device is receiving electricity, the electricity transmitting device 1 tries to perform wireless communication intermittently to know the status of the electricity receiving device such as completion of charging in the electricity receiving device 2. A charging control system that can know the status of the electricity receiving device 2 can be implemented easily.

By using the electricity transmitting antennas as illustrated in Embodiments 1 through 3 in the electricity transmitting antenna unit 620 of the electricity transmitting device 1, the non-contact power supply system whose wireless communication area and charging area are wider can be achieved.

While the invention made by the present inventors has been described specifically based on its embodiments hereinbefore, it will be obvious that the present invention is not limited to the described embodiments and various modifications may be made therein without departing from the scope of the invention.

INDUSTRIAL APPLICABILITY

The present invention relates to a non-contact charging device and can be widely applied to a non-contact charging device that performs data communication with and supplies power source to portable equipment loaded with, for example, a non-contact IC card and a battery as well as a non-contact power supply system including such portable equipment and such non-contact charging device.

EXPLANATION OF REFERENCE NUMERALS

1 Electricity transmitting device
2 Electricity receiving device
101, 614 Wireless communication unit
102, 613 Control circuit
103 Non-contact electric power transmitting unit
104, 105 Matching circuit
106 Suppression circuit
107 Adjustment circuit
110, 210, 620 Electricity transmitting antenna unit
111, 213 Wireless communication antenna coil
112, 211 Resonance coil
113, 212 Power supply coil
114, 214, 311 Resonance capacitor
310 Resonance capacitance switching circuit
312 Compensating capacitor
313 Switch circuit
610 Common-use antenna coil
611 Level detection circuit
612 Switching circuit
615 Electricity receiving unit

What is claimed is:

1. A non-contact charging device configured to perform data transmission between the non-contact charging device and a portable terminal device, and supply electric power to the portable terminal device, the data transmission and the electric power supply being performed exclusively from each other, the non-contact charging device comprising:
   a wireless communication unit configured to perform data transmission;
   a wireless communication antenna coil coupled to the wireless communication unit and used for the data transmission;
   a power supply coil; and
   a resonance coil; wherein
   the resonance coil and the wireless communication antenna coil are formed on one and the same plane,
   the power supply coil is formed on another plane different from and in parallel with the one plane, the power supply coil being formed so as to overlap the resonance coil when viewed in a direction perpendicular to the another plane,
   the data transmission is performed from the wireless communication antenna coil through the resonance coil,
   the electric power supply is performed by coupling a magnetic flux from the power supply coil with that of the resonance coil and thereby strengthening the magnetic flux, and
   the non-contact charging device further comprises a suppression circuit configured to prevent a signal induced in the wireless communication antenna coil through the resonance coil from being transferred to the wireless communication unit when electric power is supplied to the portable terminal device.

2. The non-contact charging device according to claim 1, wherein the wireless communication antenna coil surrounds the resonance coil.

3. The non-contact charging device according to claim 1, wherein the resonance coil surrounds the wireless communication antenna coil.

4. The non-contact charging device according to claim 1, further comprising a variable capacitance circuit connected to the resonance coil, wherein
   a resonance frequency provided by the resonance coil and the variable capacitance circuit is changed between at the time of data transmission and at the time of electric power supply.

5. The non-contact charging device according to claim 2, further comprising a variable capacitance circuit connected to the resonance coil, wherein
   a resonance frequency provided by the resonance coil and the variable capacitance circuit is changed between at the time of data transmission and at the time of electric power supply.

6. The non-contact charging device according to claim 3, further comprising a variable capacitance circuit connected to the resonance coil, wherein
   a resonance frequency provided by the resonance coil and the variable capacitance circuit is changed between at the time of data transmission and at the time of electric power supply.

* * * * *